(12) United States Patent
Albers et al.

(10) Patent No.: US 9,950,454 B2
(45) Date of Patent: Apr. 24, 2018

(54) METHOD FOR THE VACUUM-ASSISTED PRODUCTION OF A PUR/PIR FOAM BODY

(71) Applicant: Covestro Deutschland AG, Leverkusen (DE)

(72) Inventors: Reinhard Albers, Leverkusen (DE); Patrick Klasen, Vettweiss (DE); Stephanie Vogel, Langenfeld (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 455 days.

(21) Appl. No.: 14/418,251

(22) PCT Filed: Jul. 29, 2013

(86) PCT No.: PCT/EP2013/065922
§ 371 (c)(1),
(2) Date: Jan. 29, 2015

(87) PCT Pub. No.: WO2014/019992
PCT Pub. Date: Feb. 6, 2014

(65) Prior Publication Data
US 2015/0183143 A1 Jul. 2, 2015

(30) Foreign Application Priority Data
Jul. 31, 2012 (EP) .................................... 12178583

(51) Int. Cl.
*B29C 44/34* (2006.01)
*B29C 44/04* (2006.01)
(Continued)

(52) U.S. Cl.
CPC ...... *B29C 44/3403* (2013.01); *B29C 44/0415* (2013.01); *B29C 44/1209* (2013.01);
(Continued)

(58) Field of Classification Search
None
See application file for complete search history.

(56) References Cited

U.S. PATENT DOCUMENTS

| 2,761,565 A | 9/1956 | Hutchinson |
| 5,023,031 A * | 6/1991 | West ................. F24H 1/182 264/262 |

(Continued)

FOREIGN PATENT DOCUMENTS

| BE | WO 0039497 A1 * | 7/2000 | ............ B29C 44/322 |
| DE | 102009044515 A1 | 5/2010 | |
| WO | WO-0039497 A1 | 7/2000 | |

OTHER PUBLICATIONS

International Search Report for PCT/EP2013/065922 dated Aug. 30, 2013.

*Primary Examiner* — Michael P Rodriguez
(74) *Attorney, Agent, or Firm* — K&L Gates LLP

(57) ABSTRACT

The present invention relates to a method for producing a PUR/PIR foam body, comprising the steps of providing a mold adapted for applying an underpressure to the interior of the mold; introducing a reaction mixture comprising an isocyanate-reactive component A and an isocyanate B into the mold, and applying an underpressure to the interior of the mold, so the underpressure acts on the introduced reaction mixture. The underpressure is applied to the interior of the mold no later than the reaction mixture has started to set in the mold, and the isocyanate index of the reaction mixture is ≥300.

12 Claims, 1 Drawing Sheet

(51) Int. Cl.
   *B29C 44/12*     (2006.01)
   *C08G 18/72*     (2006.01)
   *F16L 59/02*     (2006.01)
   *B29K 75/00*     (2006.01)
   *B29K 79/00*     (2006.01)
   *B29L 7/00*      (2006.01)
   *B29L 23/00*     (2006.01)

(52) U.S. Cl.
   CPC .............. *C08G 18/72* (2013.01); *F16L 59/02* (2013.01); *B29K 2075/00* (2013.01); *B29K 2079/00* (2013.01); *B29L 2007/00* (2013.01); *B29L 2023/00* (2013.01); *Y10T 428/1376* (2015.01)

(56) References Cited

U.S. PATENT DOCUMENTS

| | | | | |
|---|---|---|---|---|
| 5,439,945 | A * | 8/1995 | Smies | B29C 44/3403 264/45.1 |
| 6,627,018 | B1 * | 9/2003 | O'Neill | B29C 44/1209 156/245 |
| 8,388,885 | B2 | 3/2013 | Bansal et al. | |
| 8,680,168 | B2 | 3/2014 | Fishback et al. | |
| 2011/0260351 | A1 | 10/2011 | Corradi et al. | |

\* cited by examiner

METHOD FOR THE VACUUM-ASSISTED PRODUCTION OF A PUR/PIR FOAM BODY

CROSS-REFERENCE TO RELATED APPLICATIONS

This application is a national stage application (under 35 U.S.C. § 371) of PCT/EP2013/065922, filed Jul. 29, 2013, which claims benefit of European Application No. 12178583.6, filed Jul. 31, 2012, both of which are incorporated herein by reference in their entirety.

FIELD

The present invention relates to a method for producing a PUR/PIR foam body, comprising the steps of providing a mold adapted for applying an underpressure to the interior of the mold; introducing a reaction mixture comprising an isocyanate-reactive component A and an isocyanate B into the mold, and applying an underpressure to the interior of the mold, so the underpressure acts on the introduced reaction mixture.

BACKGROUND

The district heating industry uses polyurethane systems to insulate pipes. This industry makes a decisive contribution to sustainability and energy saving and will therefore retain its importance as a potential outlet for rigid PUR/PIR foams in the long term. To ensure this, however, it has to be possible to operate the grids of the district heating industry in an efficient and sustainable manner. The fact that the operating temperature of such district heating grids can be up to 130° C. with short spikes up to 145° C. makes clear that only high temperature resistant rigid PUR/PIR foams qualify as an efficient and long-term insulation material.

Yet purely PUR rigid foams are state of the art. They typically have softening temperatures of about 150-160° C. and so do not qualify as high temperature resistant foams for long-term service. The district heating industry has been mindful of this problem for some considerable time and therefore tends to use insulated pipes having a very high calculated continuous operating temperature (CCOT).

According to DIN EN 253, it shall be above 120° C. for a calculated thermal life of 30 years. In correlation with the higher softening temperatures of typically >180° C., only pipes insulated with rigid PUR/PIR foams can meet this requirement.

As regards the technical processing of PUR versus PUR/PIR rigid foams, it is the reaction mixtures for PUR production which are superior in terms of flow behavior. This is pivotal for the production of molded foams where the reaction mixture has to cover long flow path as it cures. Since PIR reaction mixtures tend to flow distinctly worse than corresponding PUR reaction mixtures, they have hitherto not been used in, for example, the batchwise manufacture of pipe insulations, where flow path distances to be covered typically measure up to 12 m.

The pipe industry differentiates between continuous and batch methods of manufacturing pipes. Customary continuous ones include those where the liquid reaction mixture is sprayed onto a rotating steel pipe or poured onto such as it moves axially. The flow paths involved here are minimal, which is why rigid PUR/PIR foams are already being used here. WO 00/39497 A1 gives an example thereof.

In the batch methods of production by the pipe industry such as mid-point filling or the pour-rise technique, however, such poor-flow PUR/PIR systems are not as yet used because of the extremely long flow paths of up to 12 m.

BRIEF DESCRIPTION OF THE DRAWINGS

The present invention is elucidated in detail hereinafter with reference to a figure and working examples. The figure shows:

FIG. 1: Shows photographs of foams 2e and 2a.

DETAILED DESCRIPTION

Figure 1:
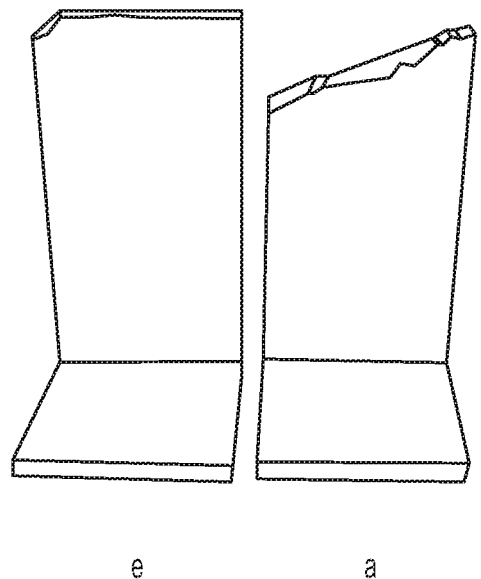

Not only pipes but also rigid foam panels can be produced in a batchwise manner. An in-principle distinction is made here between open and closed importation. In terms of flow properties, therefore, PUR/PIR reaction mixtures tend to be more predestined for the open manner of production, since the flow paths have been minimized here. However, there are commercial applications for which only the closed injection method with its distinctly longer flow paths can be considered. PUR/PIR rigid foams are interesting for this application particularly because their fire properties are distinctly superior to those of purely PUR rigid foams.

To improve the flow behavior of PUR/PIR systems, it is customary to reduce the isocyanate index. A PUR/PIR system typically has an isocyanate index of >180. Yet only indices in the range from 200 to distinctly below 300 are compatible with the batch methods of manufacture described above. This in turn leads to a distinctly lower PIR fraction and hence also to lower softening temperatures, a worse flammability rating and altogether worse thermal stability.

SUMMARY

In order, then, to successfully process high temperature resistant rigid PUR/PIR foams having very good fire properties in a batchwise manner, there are currently no technical solutions. The present invention therefore has for its object to provide a method of this type.

This object was solved according to the present invention by a method for producing a PUR/PIR foam body, comprising the steps of:
  providing a mold adapted for applying an underpressure to the interior of the mold;
  introducing a reaction mixture comprising an isocyanate-reactive component A and an isocyanate B into the mold;
  applying an underpressure to the interior of the mold, so the underpressure acts on the introduced reaction mixture;
wherein the following consecutive moments are defined in the method:
  t0: the reaction mixture has started to be introduced into the mold
  tL: the reaction mixture has started to expand in the mold
  tA: the reaction mixture has started to set in the mold
  tF: the expanded reaction mixture has finished filling the mold
wherein the underpressure is applied to the interior of the mold no later than tA, and the isocyanate index of the reaction mixture is ≥300.

It was accordingly found that, surprisingly, the flow properties of such reaction mixtures with an isocyanate index of ≥300 are distinctly improved by the application of underpressure. The prerequisite for this is that the time when, and the length of time for which, the underpressure is applied is selected in a particular way.

The method of the present invention is a batchwise method wherein an underpressure acts on a polyurethane/polyisocyanurate reaction mixture (PUR/PIR reaction mixture). This takes place in an evacuable mold. The mold may be a foam mold in the sense that the reaction mixture is imported as such into the foam mold and a foam body corresponding to the foam mold is retained after demolding (foam mold with evacuable cavity). However, it is likewise possible for the mold to be an evacuation cabin, so that, for example, the actual foam mold is introduced into this cabin and filled with the reaction mixture, the mold is closed and then the underpressure may be applied.

By "underpressure" in the context of the present invention is meant a pressure of less than 1013 mbar.

Before, during and after the expansion of the PUR/PIR reaction mixture, it is generally possible to define the following moments in time. They can be obtained by observing a free rise foam (most simply obtainable by introducing the reaction mixture into a paper bag) comprising the corresponding reaction mixture.

t0: the reaction mixture has started to be introduced into the mold.
tL (cream time): the reaction mixture has started to expand.
tA (fiber time): the reaction mixture has started to set. The fiber time indicates the transition of the reaction mixture from the liquid into the solid state. When this point in time is reached, a reaction conversion of about 50% can be assumed. The fiber time is measured manually by, for example, dipping a wooden spatula repeatedly into and out of the already considerably blown reaction mixture, and noticing when strings are trailing from the spatula. Time measurement starts with the mixing of the reaction mixture.
tF (mold fill time): the expanded reaction mixture has finished filling the mold.

It is thus also possible to define the following periods:
1) t0-tL time from importing the reaction mixture to the start of expansion
2) tL-tA time from the start of expansion to the start of setting
3) tA-tF time between the setting of the foam and the complete filling of the mold.

The effect of applying an underpressure at the right time is that (closed) molds become evenly filled with the PUR/PIR reaction mixture for the chemical setting of the latter. Overpacking or even underfilling of the mold is avoided without the chemical composition of the rigid PUR/PIR foam having to be changed. Application of the underpressure is delayed until the reaction mixture has a certain viscosity, so that the underpressure does not cause blowing agent bubbles to be ripped out of the matrix.

It is thus possible to transfer the very good fire and thermal stabilities of rigid PUR/PIR foams to applications that are obtained via batchwise production technologies.

The isocyanate index of the reaction mixture is defined as the molar ratio of NCO groups to NCO-reactive groups, multiplied by 100. The isocyanate index is preferably ≥320, more preferably ≥340.

Foams having urethane and isocyanurate groups are obtainable using in particular the following starting components:

Compounds having a molecular weight in the range of 400 g/mol to 10 000 g/mol and two or more isocyanate-reactive hydrogen atoms, for example amino-, thiol-, hydroxyl- or carboxyl-containing compounds.

Aliphatic, cycloaliphatic, araliphatic, aromatic and heterocyclic polyisocyanates, preferably diphenylmethane diisocyanate (MDI) or polyphenyl polymethylene polyisocyanates (polymeric MDI), polyisocyanates comprising carbodiimide groups, urethane groups, allophanate groups, isocyanurate groups, urea groups or biuret groups, more preferably based on polyphenyl polymethylene polyisocyanate.

Customary auxiliary and added-substance materials such as catalysts, blowing agents, crosslinkers, flame retardants, foam stabilizers, flow improvers and/or inhibitors may be used to produce the foams. Preferred blowing agents in A are hydrofluorocarbons (HFCs), hydrofluoroolefins (HFOs), hydrocarbons and mixtures thereof.

The isocyanate-reactive composition preferably comprises:
(i) an aromatic polyester polyol A1 having a hydroxyl number of ≥100 mg KOH/g to ≤350 mg KOH/g, an average OH functionality of ≥1.8 to ≤6.5,
(ii) an aliphatic polyether polyol A2a having a hydroxyl number of ≥150 mg KOH/g to ≤500 mg KOH/g, an average OH functionality of ≥1.5 to ≤5.5, and
a further aliphatic polyether polyol A2b having a hydroxyl number of ≥15 mg KOH/g to ≤150 mg KOH/g, an average OH functionality of ≥1.5 to ≤5.5, and an ethylene oxide content of ≥0% by mass to ≤50% by mass, based on the overall mass of A2b,
(iii) a blowing agent component A3, and
(iv) a catalyst component A4 comprising a catalyst A4a to catalyze polyurethane formation and a catalyst A4b to catalyze polyisocyanurate formation.

The polyols used will first be discussed in more detail in what follows. Any hydroxyl numbers referred to can be determined according to DIN 53240.

Examples of aromatic polyester polyols A1a are polycondensates of di- and also tri- and tetraols and di- and also tri- and tetracarboxylic acids or hydroxy-carboxylic acids or lactones. Instead of the free polycarboxylic acids, the corresponding polycarboxylic anhydrides or corresponding polycarboxylic esters of lower alcohols may also be used to prepare the polyesters. Examples of suitable diols are ethylene glycol, butylene glycol, diethylene glycol, triethylene glycol, polyalkylene glycols such as polyethylene glycol, also 1,2-propanediol, 1,3-propanediol, butanediol(1,3), butanediol(1,4), hexanediol(1,6) and isomers, neopentylglycol or neopentylglycol hydroxypivalate. Polyols such as trimethylolpropane, glycerol, erythritol, pentaerythritol, trimethylolbenzene or trishydroxyethyl isocyanurate may further also be used. The use of ethylene glycol and diethylene glycol is preferred. Useful polycarboxylic acids include, for example, succinic acid, fumaric acid, maleic acid, maleic anhydride, glutaric acid, adipic acid, sebacic acid, 1,10-decanedicarboxylic acid, 1,12-dodecanedicarboxylic acid, phthalic acid, phthalic anhydride, isophthalic acid, terephthalic acid, pyromellitic acid, trimellitic acid or. The use of adipic acid and phthalic anhydride is preferred.

When the average functionality of the polyol to be esterified is ≥2, monocarboxylic acids such as benzoic acid and hexanecarboxylic acid may additionally also be co-used.

It is preferable for the aromatic polyester polyol A1a to have a hydroxyl number of ≥150 mg KOH/g to ≤340 mg KOH/g (more preferably ≥200 mg KOH/g to ≤340 mg KOH/g) and an average OH functionality of ≥1.8 to ≤3.0. The acid number is preferably in the range from ≥0.1 mg KOH/q to ≤5.0 mg KOH/g.

Useful aliphatic polyether polyols A2a include, for example, polytetramethylene glycol polyethers as are obtainable by polymerization of tetrahydrofuran via cationic ring opening.

Useful polyether polyols further include addition products of styrene oxide, ethylene oxide, propylene oxide, butylene oxide and/or epichlorohydrin onto di- or polyfunctional starter molecules.

Suitable starter molecules include, for example, water, ethylene glycol, diethylene glycol, butyldiglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol and also low molecular weight hydroxyl-containing esters formed by such polyols with dicarboxylic acids.

It is preferable for the aliphatic polyether polyol A2a to have a hydroxyl number of ≥200 mg KOH/g to ≤500 mg KOH/g (more preferably ≥220 mg KOH/g to ≤450 mg KOH/g) and average OH functionality of ≥1.8 to ≤3.5.

The hydroxyl numbers selected characterize the aliphatic polyether polyol A2a as a comparatively short-chain polyol.

A preferred aliphatic polyether polyol A2a is further obtained from the reaction of one or more sugar-containing starter molecules with propylene oxide.

The same starting materials may in principle be used for the aliphatic polyether polyol A2b as for polyether polyol A2a. It is preferable for this polyether polyol A2b to have a hydroxyl number of ≥20 mg KOH/g to ≤120 mg KOH/g (more preferably 25 mg KOH/g to ≤145 mg KOH/g) and average OH functionality of ≥1.8 to ≤3.5. The ethylene oxide content of this polyol is further preferably in the range ≥0% by mass to ≤40, based on the overall mass of A2b.

The hydroxyl numbers selected characterize the aliphatic polyether polyol A2b as a comparatively long-chain polyol.

A preferred further aliphatic polyether polyol A2b is obtained from the two-step reaction of one or more sugar-containing and/or glycol starter molecules with ethylene oxide and propylene oxide.

Examples of a suitable isocyanate component B are 1,4-butylene diisocyanate, 1,5-pentane diisocyanate, 1,6-hexamethylene diisocyanate (HDI), isophorone diisocyanate (IPDI), 2,2,4- and/or 2,4,4-trimethyl-hexamethylene diisocyanate, the isomeric bis(4,4'-isocyanatocyclohexyl)methanes or their mixtures of any desired isomer content, 1,4-cyclohexylene diisocyanate, 1,4-phenylene diisocyanate, 2,4- and/or 2,6-tolylene diisocyanate (TDI), 1,5-naphthylene diisocyanate, 2,2'- and/or 2,4'- and/or 4,4'-diphenylmethane diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and also alkyl 2,6-diisocyanatohexanoates (lysine diisocyanates) with $C_1$ to $C_6$ alkyl groups.

In addition to the aforementioned polyisocyanates, it is also possible to use modified diisocyanates of uretdione, isocyanurate, urethane, carbodiimide, uretoneimine, allophanate, biuret, amide, iminooxadiazinedione and/or oxadiazinetrione structure and also unmodified polyisocyanate having more than 2 NCO groups per molecule such as, for example, 4-isocyanatomethyl-1,8-octane diisocyanate (nonane triisocyanate) or triphenylmethane 4,4',4''-triisocyanate pro rata.

The isocyanate may be a prepolymer obtainable by reacting an isocyanate having an NCO functionality of ≥2 and polyols having a molecular weight of ≥62 g/mol to ≤8000 g/mol and OH functionalities of ≥1.5 to ≤6.

Blowing agent component A3 comprises, for example, chemical blowing agents such as water and/or physical blowing agents such as hydrocarbon blowing agents (especially n-pentane, i-pentane and cyclopentane and mixtures thereof), halogenated hydrocarbon blowing agents and halogenated olefins.

With regard to catalyst component A4, examples of polyurethane catalyst A4a are aminic catalysts, particularly selected from the group triethylenediamine, N,N-dimethylcyclohexylamine, dicyclohexylmethylamine, tetramethylenediamine, 1-methyl-4-dimethylaminoethylpiperazine, triethylamine, tributylamine, dimethylbenzylamine, N,N',N''-tris-(dimethylaminopropyl)hexahydrotriazine, tris(dimethyl-aminopropyl)amine, tris(dimethylaminomethyl)phenol, dimethylaminopropylformamide, N,N,N',N'-tetramethyl-ethylenediamine, N,N,N',N'-tetramethylbutanediamine, tetramethylhexanediamine, pentamethyldiethylenetriamine, pentamethyldipropylenetriamine, tetramethyldiaminoethyl ether, dimethylpiperazine, 1,2-dimethylimidazole, 1-azabicyclo[3.3.0]octane, bis(dimethylaminopropyl)urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanol-amine, N-ethyldiethanoiamine and/or dimethylethanolamine. Examples of polyisocyanurate catalyst A4b are tin compounds such as tin(II) acetate, tin(II) octoate, tin(II) ethylhexoate, tin(II) laurate, dibutyltin diacetate, dibutyltin dilaurate, dibutyltin maleate and/or dioctyltin diacetate, also nitrogen heterocycles such as tris(N,N-dimethylaminopropyl)-s-hexahydrotriazine, hydroxides such as tetramethylammonium hydroxide and/or sodium hydroxide or carboxylic acid salts of an alkali metal such as sodium N-[(2-hydroxy-5-nonylphenyl)methyl]-N-methylamino acetate, sodium acetate, sodium octoate, potassium acetate and/or potassium octoate or mixtures thereof.

The isocyanate-reactive composition A may further comprise auxiliary and added-substance materials, for example:
(v) at least a foam stabilizer, preferably a polyether siloxane which, in general, is constructed as a copolymer formed from ethylene oxide and/or propylene oxide and is attached to a polydimethylsiloxane moiety, and
(vi) at least a flame retardant, preferably brominated and/or chlorinated polyols or phosphorus compounds (these types of flame retardants are described for example in "Kunststoffhandbuch", volume 7 "Polyurethane", chapter 6.1; for example the esters of orthophosphoric acid and of metaphosphoric acid, which may each likewise contain halogens; the use of room temperature liquid flame retardants is preferred).

Embodiments of the invention will now be more particularly described. They may be combined with each other in any desired manner as long as the context does not clearly suggest otherwise. Embodiments are further not foreclosed by their particularization; this does not conclude the particularization of embodiments according to the present invention.

In one embodiment, the catalyst component comprises a tertiary amine and a carboxylic acid salt of an alkali metal. N,N-Dimethylbenzylamine and potassium acetate are preferably concerned here.

In a further embodiment, the mass ratio of A1:(A2a+A2b) is between ≥1:1 and ≤6:1 and the mass fraction of the sum total of A1 and (A2a+A2b) is between ≥65% by mass and ≤85% by mass, based on the overall mass of A. A mass ratio of ≥1.5:1 to ≤4:1 between A1:(A2a+A2b) is preferable.

In a further embodiment, the mass ratio of A2a:A2b is between ≥0.3:1 and ≤3:1. A mass ratio of ≥0.5:1 to ≤2:1 is preferable.

In a further embodiment, isocyanate component B comprises at least an isocyanate selected from the group:
2,2'-methylenediphenyl diisocyanate, 2,4'-methylenediphenyl diisocyanate, 4,4'-methylenediphenyl diisocyanate, polynuclear methylenediphenyl diisocyanate, 2,4-tolylene diisocyanate, 2,6-tolylene diisocyanate, diisocyanatobenzene and/or naphthyl diisocyanate;
and/or isocyanate component B comprises:
at least an NCO-terminated prepolymer obtainable by reacting at least one of the aforementioned isocyanates with at least a polyol.

Polynuclear (polymeric) MDI is the preferred isocyanate. With regard to prepolymers, the polyols are preferably selected from aliphatic or aromatic polyether polyols having from 1 to 6 hydroxyl groups each or aliphatic or aromatic polyester polyols each with a number-averaged molecular mass between ≥60 g/mol and ≤1000 g/mol.

In a further embodiment of the method according to the present invention, the underpressure is applied before tA and ≥50% to ≤80% of the total period for which the underpressure is applied is before tA. The corresponding application of underpressure even before setting further augments the rise of a viscous reaction mixture in a mold. Preferably, ≥55% to ≤70% of the total period for which the underpressure is applied is before tA. Accordingly, ≥20% to ≤50%, preferably ≥30% to ≤45% of the total period for which the underpressure is applied is after tA.

In a further embodiment of the method according to the present invention, applying the underpressure is terminated before tF. This ensures that the foaming reaction mixture is able to reach even difficult-to-access places. Preferably, applying the underpressure is terminated ≥1 second to ≤10 seconds, more preferably ≥2 seconds to ≤5 seconds with the interior of the mold being brought to ambient pressure.

In a further embodiment of the method according to the present invention, applying the underpressure is terminated at tF or after tF.

In a further embodiment of the method according to the present invention, the isocyanate index of the reaction mixture is ≥300 to ≤500. The isocyanate index is preferably ≥320 to ≤450, more preferably ≥340 to ≤400.

In a further embodiment of the method according to the present invention, the underpressure is applied for a total period of ≥5 seconds to ≤180 seconds. This duration is preferably ≥10 seconds to ≤150 seconds, more preferably ≥15 seconds to ≤120 seconds.

In a further embodiment of the method according to the present invention, the underpressure is ≥0.01 bar to ≤0.95 bar. This is to be understood as meaning the absolute underpressure in the mold (i.e., not as a difference relative to an ambient pressure). The underpressure is preferably ≥0.1 bar to ≤0.85 bar, more preferably ≥0.5 bar to ≤0.95 bar.

In a further embodiment of the method according to the present invention, the magnitude of the applied underpressure is temporally variable. The underpressure may rising and/or fall as a function of time. For instance, the underpressure may fall from an initial value to a final value. It is also possible, for example, for the underpressure to remain at a certain plateaued value before it is further lowered to a final value. It is further possible for the underpressure to decrease again (i.e., for the absolute pressure in the mold to rise again) in the interim or at the end of the underpressure application period.

The temporal variability of the underpressure prevailing in the mold provides even better control of foam development.

In a further embodiment of the method according to the present invention, the introducing of a reaction mixture into the mold is effected such that the reaction mixture comes into contact with at least one article that is present in the mold and differs from the mold. What is accordingly the case here is that the mold assumes the office of an evacuation chamber: the article is for example placed in the mold, contacted (filled) with the reaction mixture, the mold is closed and the underpressure is then applied to the interior of the mold.

Preferably, the article is a hollow body and the reaction mixture is in the interior of the hollow body.

In a likewise preferred embodiment, the reaction mixture is between two face layers. Discontinuous insulation panels are obtainable in this way. The face layers may be provided in a mutually spaced-apart state, by means of spacers or via suitable recesses in the mold, and the reaction mixture is then introduced between the face layers, the mold is closed and the underpressure is applied. Suitable materials for face layers include, for example, plastics and layers of steel and of aluminum.

In a further preferred embodiment, the reaction mixture is on the outside surface of a pipe. Pipes of this type are useful as district heating pipes for example. It is even more preferable in this context for the reaction mixture to be present between the outside surface of a first pipe and the inside surface of a second pipe while the first pipe is disposed within the second pipe.

In a further embodiment of the method according to the present invention, the flow index of the reaction mixture after application of the underpressure is ≥1.0 to ≤1.3. This flow index is defined as hE/hG, where hE is the attained final height of the foam and hG is the height of the foam at the gel point tG in a vacuum rigid-foam riser. This gel point tG may be equated with the onset of setting (see above). A preferred range for the flow index is ≥1.0 to ≤1.2.

The present invention likewise provides a PUR/PIR foam body obtained by a method according to the present invention. In a further embodiment, the PUR/PIR foam body is an insulation panel or an insulated pipe.

EXAMPLES

The examples which follow are offered to provide an even more thoroughgoing elucidation of the present invention.

Rigid PUR/PIR foams were produced according to the familiar one-shot method wherein the reaction components are continuously or batch reacted with one another and then cured in/on suitable molds/substrates. Examples are described in U.S. Pat. No. 2,761,565, in G. Oertel (ed.) "Kunststoff-Handbuch", volume VII, Carl Hanser Verlag, 3rd edition, Munich 1993, p. 267 et seq., and also in K. Uhlig (ed.) "Polyurethan Taschenbuch", Carl Hanser Verlag, 2nd edition, Vienna 2001, pp. 83-102.

In the case of the present invention, the 2-component recipe involving a polyol formulation A, a physical blowing agent T and an isocyanate B was processed by conventionally mixing these components via a stirrer on a laboratory scale. Tests were further carried out on a conventional high-pressure machine for processing of polyurethane.

Glossary polyol 1: polyester polyol having a hydroxyl number of 240 mg KOH/g, a theoretical functionality of 2.0 and a viscosity of 15 600 mPas at 25° C. (BMS AG)

polyol 2: polyether polyol having a hydroxyl number of 440 mg KOH/g, a theoretical functionality of 2.8 and a viscosity of 440 mPas at 25° C. (BMS AG)

polyol 3: polyether polyol having a hydroxyl number of mg KOH/g, a theoretical functionality of 2.0 and a viscosity of 860 mPas at 25° C. (BMS AG)

TEP: triethyl phosphate

Tegostab B 8461: foam stabilizer (Evonik)

Desmorapid 1792: catalyst (BMS AG)

Desmorapid DB: catalyst (BMS AG)

cyclopentane: physical blowing agent (Exxon Mobil)

isocyanate: polymeric MDI (Desmodur 44V20L, BMS AG)

Example Group 1: Production of PUR/PIR Foams in the Lab

Polyol formulation A was reacted with blowing agent T and isocyanate B in the lab by manual mixing in a reaction vessel (cardboard cup) at 1000 rpm via a commonly used stirrer. Raw material temperature was 23° C. in each case.

a) Free Rise Foams

To produce free rise foams, the reaction mixture was poured into a paper mold. The foam was able to rise up freely in the mold. The mold did not apply any counterpressure whatsoever, so the foam only had to overcome air pressure to rise. The free rise foams thus obtained were analyzed regarding their apparent density in the core and their fire properties.

b) Molded Foams

To produce molded foams, 991 g of the reaction mixture for setting a density of 60 kg/m³ were poured into a mold having a volume of 16.5 L and the mold was subsequently closed. Mold temperature was 55° C. The molded foams thus obtained were analyzed regarding their apparent density in the core, their mechanical properties as a function of temperature and their fire properties.

c) Flow Properties of Foam at Atmospheric Pressure

To investigate the flow properties of the foams, the reaction vessel containing a reaction mixture quantity standardized for this method (265 g) was, after the stirring process, introduced into a heatable riser (HSR, rigid foam riser) 150 cm in height and 9.1 cm in internal diameter. Riser temperature was 35° C. Height of rise and the pressure were detected as a function of time and corrected according to the particular prevailing air pressure to a standard pressure of 1013 mbar. The following variables must be distinguished here: tG (gel point in s), hG (height at time tG in cm), hE (attained final height of foam in cm), flow index (quotient formed by dividing hG into hE).

d) Flow Properties of Foam at Underpressure

To investigate the flow properties of the foams at an applied underpressure, the reaction vessel containing a reaction mixture quantity standardized for this method (265 g) was, after the stirring process, introduced into a heatable riser (V-HSR, vacuum rigid foam riser) 150 cm in height and 9.1 cm in internal diameter. Riser temperature was 35° C. The applied underpressure was 40 mbar. Height of rise and the pressure were detected as a function of time. The following variables must be distinguished: tG (gel point in s), hG (height at time tG in cm), hE (attained final height of foam in cm), flow index (quotient formed by dividing hG into hE).

The results of the lab tests are shown below in table 1. Example No. V1 is a comparative example.

TABLE 1

| Example No. | | V1 | 2 |
|---|---|---|---|
| polyol 1 | parts by weight | 57.0 | 57.0 |
| polyol 2 | parts by weight | 13.0 | 13.0 |
| polyol 3 | parts by weight | 13.0 | 13.0 |
| TEP | parts by weight | 15.0 | 15.0 |
| water | parts by weight | 1.6 | 1.6 |
| B8461 | parts by weight | 2.0 | 2.0 |
| Desmorapid 1792 | parts by weight | 1.4 | 2.1 |
| Desmorapid DB | parts by weight | 0.5 | 0.8 |
| overall amount | parts by weight | 100 | 100 |
| cyclopentane | parts by weight | 6.2 | 12.7 |
| Isocyanate 44V20 | parts by weight | 148 | 259 |
| isocyanate index | | 200 | 350 |
| Free rise foam | | | |
| raw material temperature | ° C. | 23 | 23 |
| stirrer setting | rpm | 1000 | 1000 |
| stirring time, $t_R$ | s | 15 | 15 |
| cream time, $t_L$ | s | 40 | 35 |
| fiber time, $t_4$ | s | 108 | 100 |
| free-rise apparent density | kg/m³ | 40.2 | 40.2 |
| flame height | Mm | 144 | 128 |
| Molded foam | | | |
| introduced apparent density | kg/m³ | 60 | 60 |
| flame height[a] | Mm | 135 | 116 |
| softening point[b] | ° C. | 208 | 234 |
| HSR | | | |
| tG | s | 98 | 108 |
| flow index | hE/hG | 1.19 | 1.33 |
| V-HSR | | | |
| tG | s | 102 | 109 |
| flow index | hE/hG | 1.11 | 1.13 |

[a]small burner test to DIN EN ISO 11925-2;
[b]as per torsion measurement to DIN EN ISO 6721-2.

The recipe of Comparative Example V1 differs from that of Example 2 in the isocyanate index only. Catalysis and blowing agent quantity were conformed to the increased amount of isocyanate. The two examples gave comparable free-rise apparent densities and reactivity profiles, as is apparent from the cream times and fiber times. However, the fire properties are fundamentally different, for example, in that V1 has a flame height of 144 mm in the free rise foam with the lower isocyanate index, whereas the flame height in the free rise foam of Example 2 with the higher isocyanate index is only 128 umm. This trend is also clear in the molded foams, where an almost 20 mm difference in flame height was measured between the foams of isocyanate index 200 and isocyanate index 350. This makes clear the advantage of a higher isocyanate index in relation to the fire properties of rigid PUR/PIR foams. The differing softening points also quickly illustrate the advantage of a higher isocyanate index. This is because the softening point is 234° C. in the case of Example 2, involving an index of 350, and hence 26° C. higher than that of Comparative Example V1, involving an isocyanate index of only 200.

The actual reason why the prior art production of molded foams utilizes nonetheless rigid PUR/PIR foams having isocyanate indices of about 200 and not those having isocyanate indices of about 350 is their superior flowability. The flow index is a measure of that. In the case of Comparative Example V1 having an isocyanate index of 200, the flow index on foaming in the HSR under atmospheric pressure was 1.19, whereas that of Example 2 at 1.33 was distinctly higher. The application of a small underpressure of 40 mbar was very beneficial to the flow properties in both cases. This procedure even succeeds in benefiting the flowability of foam with isocyanate index 350 to such an extent that at a flow index of 1.13 it is nearly identical to that of Comparative Example V1 at 1.11.

Example Group 2: Mechanical Production of PUR/PIR Foams

An HK270E (Hennecke) high pressure machine with an MQ-18 mix head (Hennecke) was used for the tests. The circuit pressure and the processing pressure at the mix head was 150 bar in each case for both raw materials. Raw material temperature at the mix head was 28° C. for both. Processing was done to an output rate of 391 g/s and a throttle setting of 14 mm. The mold used was an L-shaped sealable mold having a volume of 36.25 L that could be operated with applied underpressure as well as at atmospheric pressure. The tests were all carried out by using one and the same vent hole (top right) for both venting and the application of underpressure. The temperature of the L-mold was 55° C. in all cases. The same amount (1800 g) of reaction mixture was introduced into the mold in every test, so the flow properties of the foam as a function of the prevailing counter-pressure could be deduced from the degree to which the mold was filled by the foam.

a) Processing without Underpressure in the L-Mold

The PUR/PIR reaction mixture foamed up against the prevailing air pressure. The mold was vented top right. After ten minutes, the mold was opened and the degree of filling of the mold by the rigid PUR/PIR foam was assessed.

b) Processing with Underpressure in the L-Mold

The PUR/PIR reaction mixture initially foamed up against the prevailing air pressure. At a defined time (15 s, 30 s and 45 s) after commencement of importation (0 s) an underpressure (0.1 bar, 0.2 bar) was applied for a defined period (45 s, 30 s and 15 s). The mold was vented top right. After ten minutes, the mold was opened and the degree of filling of the mold by the rigid PUR/PIR foam was assessed.

The apparent densities reported were measured on a 1000 cm$^3$ cube (10×10×10 cm) by determining the corresponding mass. Further test methods were torsion to determine the softening point (DIN EN ISO 6721-2) and fire class (DIN EN ISO 11925-2).

The recipe of Example 2 was used to carry out mold foaming tests on the machine with and without underpressure. The results are summarized below in table 2.

TABLE 2

Results of machine tests[a] with Example Recipe 2 (isocyanate index 350) Example 2

|  |  | a (comp.) | b | c | d | e |
|---|---|---|---|---|---|---|
| cream time, tL | S | 10 | 10 | 10 | 10 | 10 |
| fiber time, tA | S | 55 | 55 | 55 | 55 | 55 |
| mold fill time, tF | S | 62 | 62 | 62 | 62 | 62 |
| free-rise apparent density | kg/m$^3$ | 40.2 | 40.2 | 40.2 | 40.2 | 40.2 |
| output | G | 1800 | 1800 | 1800 | 1800 | 1800 |
| underpressure (relative) | bar | 0 | 0.1 | 0.1 | 0.1 | 0.2 |
| period with underpressure (from-to) | S | — | 15-60 | 30-60 | 45-60 | 45-60 |
| duration of applied underpressure | S | 0 | 45 | 30 | 15 | 15 |
| volume filled | % | 88.5 | 93.0 | 94.0 | 95.0 | 99.5 |

[a]Hennecke HK270, MQ-18 mix head, output 391 g/s, raw material temperature at mix head 28° C.

The reported relative underpressure is to be understood as meaning that, for example, a relative underpressure of 0.1 bar corresponds to a pressure which is 0.1 bar lower than the ambient pressure (atmospheric pressure).

In the case of Example 2a, the same amount of reaction mixture was introduced into the mold, but the foaming was carried out without underpressure. As expected, the mold was only 88.5% full. This is attributable to the poor flow properties of this recipe from Example 2 with an isocyanate index of 350. Tests were then carried out with an underpressure of 0.1 bar in Examples 2b, 2c and 2d, in each case applied at various times (after 15 s, 30 s and after 45 s) during the foaming process. The mold was spontaneously vented in each case shortly before the mold fill time (after 60 s).

Thus, Examples 2b, 2c and 2d foamed up for 45 s, 30 s and 15 s, respectively, against a counter-pressure reduced by 0.1 bar compared with Example 2a. It is clear from table 2 that the choice of the right time to apply the underpressure is determinative for the successful foaming out of the mold. Thus, in Example 2d the largest volume of the mold was foamed out at an underpressure of just 0.1 bar. Reducing the counter-pressure by a further 0.1 bar from 45 s to 60 s led to 99.5% filling of the mold in the case of Example 2e. In Example 2e, therefore, the optimal processing conditions were found to fully fill one and the same mold successfully with the Example 2 formulation which has poor flow at normal pressure.

Figure 2:
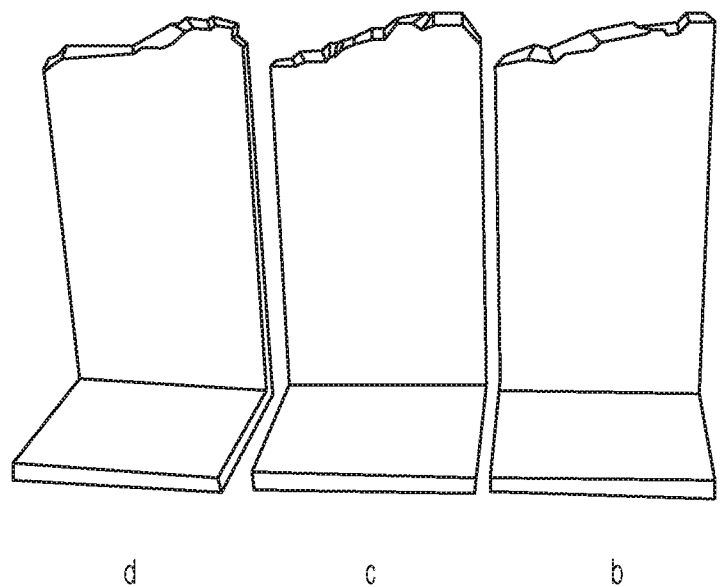
FIG. 2: Shows photographs of foams 2d, 2c and 2b.

Photographs of foams 2e and 2a (comparator) are shown in FIG. 1. Photographs of foams 2d, 2c and 2b are shown in FIG. 2.

What is surprising here is that the time at which the counter-pressure is reduced has to be chosen very carefully. In this case, this time is distinctly later than the cream time tL. The optimal time window here opens just before the fiber time tA and closes just before the mold fill time tF. It was further found that, surprisingly, a short time (see table 2) during which underpressure is applied is much more effective than a distinctly longer period.

The present invention accordingly describes a technical method whereby even rigid PUR/PIR foam recipes having poor flow properties are successfully processable in molded foamings. The actual chemical composition does not need to be adapted for this. The technical process solely requires that a defined underpressure be applied at the right time. This procedure is the first to make the high isocyanate index PUR/PIR recipes, which are actually preferable because of their superior mechanical properties and their superior fire behavior, available for the batch production of molded foams.

What is claimed is:

1. A method for producing a PUR/PIR foam body, comprising the steps of:
providing a mold adapted for applying an underpressure to the interior of the mold;
introducing a reaction mixture comprising an isocyanate-reactive component A and an isocyanate B into the mold;
applying an underpressure to the interior of the mold, so the underpressure acts on the introduced reaction mixture;
wherein the following consecutive moments are defined in the method:
t0: the reaction mixture has started to be introduced into the mold
tL: the reaction mixture has started to expand in the mold
tA: the reaction mixture has started to set in the mold tF: the expanded reaction mixture has finished filling the mold wherein the isocyanate index of the reaction mixture is ≥300, and wherein the underpressure is applied before tA, and ≥50% to ≤80% of the total period for which the underpressure is applied, is before tA.

2. The method as claimed in claim 1, wherein applying the underpressure is terminated before tF.

3. The method as claimed in claim 1, wherein applying the underpressure is terminated at tF or after tF.

4. The method as claimed in claim 1, wherein the isocyanate index of the reaction mixture is ≥300 to ≤500.

5. The method as claimed in claim 1, wherein the underpressure is applied for a total period of ≥5 seconds to ≤180 seconds.

6. The method as claimed in claim 1, wherein the underpressure is ≥0.01 bar to ≤0.95 bar.

7. The method as claimed in claim 1, wherein the magnitude of the applied underpressure is temporally variable.

8. The method as claimed in claim 1, wherein the introducing of the reaction mixture into the mold is effected such that the reaction mixture comes into contact with at least one article that is present in the mold and differs from the mold.

9. The method as claimed in claim 8, wherein the at least one article is a hollow body and the reaction mixture is in the interior of the hollow body.

10. The method as claimed in claim 8, wherein the reaction mixture is between two face layers.

11. The method as claimed in claim 8, wherein the reaction mixture is on the outside surface of a pipe.

12. The method as claimed in claim 1, wherein the flow index of the reaction mixture after application of the underpressure is ≥1.0 to ≤1.3.

* * * * *